United States Patent [19]

McCulley

[11] Patent Number: 4,848,861

[45] Date of Patent: Jul. 18, 1989

[54] EARPIECE CUSHION APPARATUS FOR EYEGLASSES

[76] Inventor: William S. McCulley, 1623 Glorietta Blvd., Coronado, Calif. 92118

[21] Appl. No.: 206,393

[22] Filed: Jun. 14, 1988

[51] Int. Cl.⁴ .................................................. G02C 5/14
[52] U.S. Cl. ...................................... 351/123; 351/157
[58] Field of Search ............... 351/123, 156, 157, 122; 24/3 C

[56] References Cited

U.S. PATENT DOCUMENTS 2,294,840 9/1942 Dunn .
2,502,734 4/1950 Lyons .
3,684,356 8/1972 Bates .................................... 351/123
3,953,114 3/1976 Bidgood ............................... 351/123

Primary Examiner—Rodney B. Bovernick
Attorney, Agent, or Firm—Henderson & Sturm

[57] ABSTRACT

A cushion apparatus (10) for the ear hook portions (101) of the temple pieces (100) of a pair of eyeglasses wherein the cushion apparatus (10) comprises an elongated hollow body member (11) having an enlarged head portion (12) and a downwardly depending reduced dimension wedge element (13), wherein the wedge element (13) is dimensioned to rest on the bridge (21) of the users ears (20) to provide vertical support to the eyeglass temple pieces (100).

6 Claims, 1 Drawing Sheet

EARPIECE CUSHION APPARATUS FOR EYEGLASSES

TECHNICAL FIELD

This invention relates generally to cushioning apparatus for eyeglasses and more specifically to an eyeglass earpiece cushioning device.

BACKGROUND OF THE INVENTION

This invention was the subject matter of Document Disclosure Program Registration No. 176265 which was filed in the U.S. Patent and Trademark Office on Aug. 26, 1987.

As can be seen by reference to the following U.S. Pat. Nos. 2,502,734; 2,294,840; 3,684,356; and, 3,953,114 the prior art is replete with myriad and diverse temple cushioning apparatus. While most of the prior art constructions comprise an elongated hollow tubular cushioning element having a generally uniform cross-sectional configuration, at least one of the prior art constructions involves a cushion element that either frictionally grasps the sides and bottom of the eyeglass temple piece proximate the hooked end, or has a portion that is received within a contoured recess formed in the hooked end of the temple piece.

While all of the aforementioned prior art constructions are considered to be adequate for the basic purpose and function for which they were developed, these prior art constructions are also uniformly deficient in one very important respect in that: they employ extensive surface area contact between the bridge of the ear and the sides of the users skull and ears; in order to provide the frictional engagement deemed necessary to retain the eyeglasses at the desired location on the user's face.

In addition, when the user is engaged in strenuous activity such as running or playing competitive sports the large surface area contact between the user's skin and the cushion elements results in abrasions and tenderness developing around the user's ears. Furthermore, since most of the prior art constructions rely primarily and simply on the coefficient of friction that exists between the cushioning material and the users skin to maintain the eyeglasses in place, the lubricating presence of perspiration and/or other body oils can reduce that coefficient of friction to the point where slippage and/or loss of the eyeglasses may take place during vigorous activity.

Obviously there has existed a long standing need among eyeglass users, and others who were concerned with this problem, for an improved eyeglass temple cushion construction which would possess superior friction, cushioning and retention characteristics over what had formerly been available with the previously patented constructions.

BRIEF SUMMARY OF THE INVENTION

The earpiece cushion apparatus that forms the basis of the present invention comprises in general: an elongated hollow tubular body member having an enlarged head element with a downwardly depending wedge portion.

The apparatus is fabricated from a soft resilient material having a high coefficient of friction such as neoprene or the like; wherein the dimensioning and resilience of the body member, head element, and wedge portion produce a limited surface area contact on the bridge of the ear, while at the same time producing a large surface area contact between the sides of the users skull and ears directly above the point of contact with the bridge of the ears.

As will be explained in greater detail further on in the specification the material, contour and configuration employed in the development of this ear piece cushioning apparatus produce a secure wedging effect which will support and immobilize a pair of eyeglasses on a user's head even during prolonged durations of strenuous activity.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein.

BEST MODE FOR CARRYING OUT THE INVENTION

Figure 1:
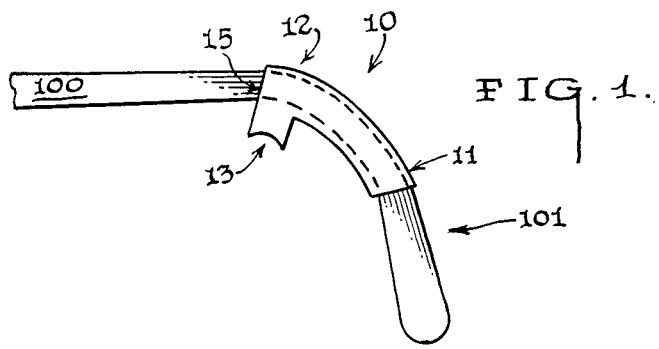
FIG. 1 is a side plan view of the cushion apparatus installed on the ear hook portion of an eyeglass temple.

As can be seen by reference to the drawings and in particular to FIG. 1, the earpiece cushion apparatus for eyeglasses that forms the basis of the present invention is designated generally by the reference numeral (10). The cushion apparatus (10) comprises in general: a pair of cushion units including an elongated hollow body member (11), an enlarged hollow head element (12), and a wedge portion (13). The aforementioned structural components of each of the cushion units will presently be described in seriatim fashion.

Figure 2:
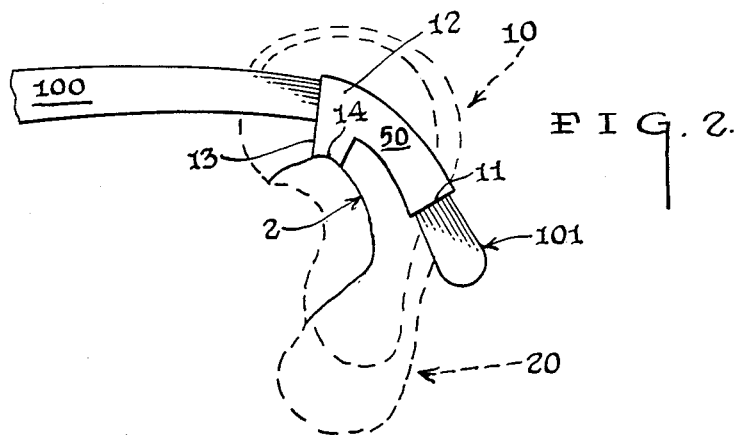
FIG. 2 is a side plan view of the engagement of the apparatus with the bridge of a user's ear.

As mentioned earlier on in the specification and depicted in FIGS. 1 and 2, the cushion apparatus (10) of this invention was specifically developed for use on the ear hook portion (101) of the temple pieces (100) of a pair of conventional eyeglasses (not shown).

Figure 4:
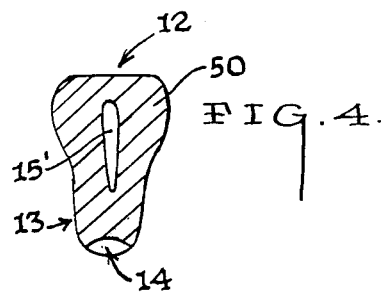
FIG. 4 is an enlarged cross-sectional view of the apparatus taken thru line 4—4 of FIG. 3.
Figure 5:
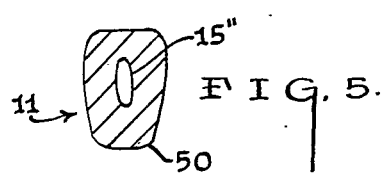
FIG. 5 is an enlarged cross-sectional view of the apparatus taken thru line 5—5 of FIG. 3.

As can be seen by reference to FIGS. 1, 4, and 5, each of the elongated hollow body members (11) is provided with an elongated contoured tapered stem aperture (15) which extends completely through both the body member (11) and enlarged head element (10) of the apparatus (10). In addition, the entire apparatus (10) is fabricated from a soft pliable resilient material (50) having a high coefficient of friction, such as neoprene, or the like; wherein, the stem apertures (15) are dimensioned and adapted to expand to receive and snugly engage the ear hook portion (101) of each of the temple pieces (100), in a well recognized manner.

Figure 3:
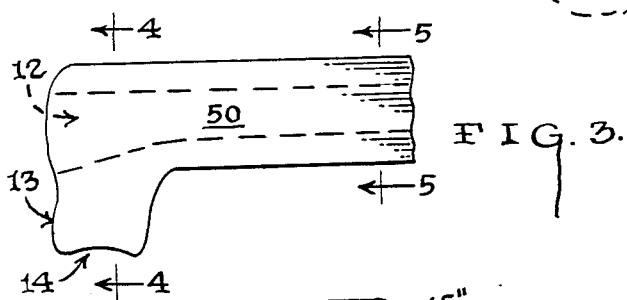
FIG. 3 is an isolated side plan view of the apparatus.
Figure 6:
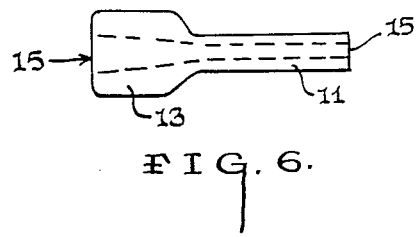
FIG. 6 is a top plan view of the apparatus.

As shown in FIGS. 3 and 6, the enlarged head portion (12) of each of the cushion units are disposed on the inboard ends of the hollow body members (11); wherein, the thickness of the enlarged head portion (12) is approximately 50% greater than the thickness of the body member (11); while the length of the body member (11) is approximately twice as long as the length of the enlarged head portion (12).

Turning now to FIGS. 1 thru 4, it can be appreciated that the wedge element (13) of each of the cushion units depends downwardly and constitutes a reduced dimension extension of the enlarged head portion (12). As can be seen particularly by reference to FIG. 2, the arcuate bottom edge (14) of the wedge element (13) provides a limited surface area contact between the cushion apparatus (10) and the bridge (21) of the user's ear (20), which is depicted in dashed lines; wherein, the curved bottom (14) of the wedge element provides the sole source of vertical support for the ear hook portion (101) of the temple pieces (100) relative to the bridge (21) of the user's ears (20).

Figure 7:
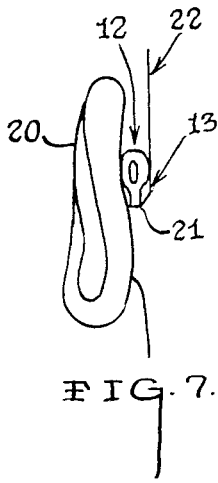
FIG. 7 is an enlarged detail view of the engagement of the apparatus with the side of the user's head as viewed from the rear.

At this juncture it should be appreciated that as shown in FIG. 7, the major point of contact between the cushion apparatus (10) and the user's ear (20) and skull (22) occurs in the immediate vicinity of the enlarged head element (12) and wedge portion (13) of the apparatus (10); wherein, the wedge portion (13) is essentially wedged into the narrow crevice on the bridge (21) of the ear at the juncture of the bridge (21) and the skull (22), and wherein the enlarged head element (12) is resiliently compressed between the side of the user's ear (20) and the skull (22). The remaining frictional contact between the cushion apparatus (10) and the user occurs along the inside surface of the body member (11) which covers the trailing end of the ear hook portion (101) of the temple piece (100).

In addition, as can be seen by reference to FIG. 2 the overall length of the cushion apparatus (10) is chosen such that for all practical intents and purposes; the presence of the apparatus (10) will not be noticeable when viewed from most angles due to the relative size of the apparatus as compared to the size of the user's ears (20).

It should also be appreciated at this juncture that by virtue of the dimensioning and configuration of the apparatus (10), only limited surface area contact is maintained and required between the user's head and the apparatus (10), in order to retain the user's eyeglasses in place on the user's head, due to both the compression and the frictional engagement of the resilient material (50) of the apparatus (10) and the user's head.

As can further be appreciated by reference to FIGS. 3 thru 6, the elongated tapered stem aperture (15) comprises an enlarged aperture opening (15') in the enlarged head portion (12); wherein, the dimension of the stem aperture (15) diminishes along the length of the apparatus (10) to a relatively small aperture opening (15") at the outboard end of the body member (11).

The reason for the relative difference in the size of the stem aperture openings (15')(15") on the opposite ends of the apparatus (10) is not a mere matter of choice, but has been specifically chosen to make the apparatus foolproof regarding the orientation of the apparatus (10) relative to temple piece (100).

Given the disparity of the relative sizes of the aperture openings (15')(15") it will be a relatively simple matter to insert the trailing end of the ear hook portion (101) of the temple piece (100) into the aperture opening (15') of the enlarged head portion (12) of the apparatus (10); while it will be virtually impossible to reverse the insertion of the ear hook portion (101) of the temple piece (100) into the aperture opening (15") of the body member (11) of the apparatus.

As a consequence of the foregoing arrangement the apparatus (10) will always be oriented with respect to the temple piece (100) as depicted in FIGS. 1 and 2 of the drawings.

Having thereby described the subject matter of this invention it should be obvious that many substitutions, modifications, and variations of the invention are possible in light of the above teachings. It is therefore to be understood that the invention as taught and described herein, is only to be limited to the extent of the breadth and scope of the appended claims.

I claim:

1. A cushion apparatus for use in combination with the ear hooks of the temple pieces of a pair of conventional eyeglasses wherein the cushion apparatus comprises:

an elongated hollow body member having an enlarged head portion formed on one end and a reduced dimension wedge element formed integrally with and depending below said enlarged head portion; and, an elongated tapered aperture extending through said elongated body member and said enlarged head portion; wherein, the aperture opening in the enlarged head portion is substantially larger than the aperture opening in the other end of said body member to insure that the cushion apparatus is installed in the proper orientation relative to the said temple pieces.

2. The cushion apparatus as in claim 1 wherein the thickness of said enlarged head portion is approximately 50% greater than the thickness of said elongated hollow body member.

3. The cushion apparatus as in claim 2 wherein the length of said hollow body member is approximately twice the length of said enlarged head portion.

4. The cushion apparatus as in claim 3 wherein the hollow body member, the enlarged head portion and the wedge element are fabricated from a material having the following characteristics: soft, resilient, compressible, and possessing a high coefficient of friction.

5. The cushion apparatus as in claim 4 wherein the bottom of the wedge element is dimensioned to make limited surface area contact with the bridge of a user's ear.

6. The cushion apparatus as in claim 5 wherein the bottom of the wedge element provides the sole source of vertical support to the ear hook portions of the temple pieces relative to the bridge of the user's ears.

* * * * *